United States Patent

[11] 3,617,623

[72] Inventor Austin Ross
Monroe, Conn.

[21] Appl. No. 3,118
[22] Filed Jan. 15, 1970
[45] Patented Nov. 2, 1971
[73] Assignee Printing Developments, Inc.
New York, N.Y.

[54] APPARATUS FOR CONTROLLING PHOTOCOMPOSITION ON A CRT SCANNER
12 Claims, 4 Drawing Figs.

[52] U.S. Cl. ........ 178/5.2 A, 178/5.4 CD
[51] Int. Cl. ........ H04n 9/12
[50] Field of Search ........ 178/5.2 R, 5.2 A, 5.4 CD, DIG. 6

[56] References Cited

UNITED STATES PATENTS

| | | | |
|---|---|---|---|
| 2,985,064 | 5/1961 | Dimmick | 178/DIG. 6 |
| 3,275,741 | 9/1966 | Hughes et al. | 178/5.2 |

*Primary Examiner*—Richard Murray
*Assistant Examiner*—P. M. Pecori
*Attorney*—Brumbaugh, Graves, Donohue & Raymond

ABSTRACT: As described herein, the sweep circuits of a flying spot scanner in a photocomposition system are controlled in accordance with preselected positional and magnitudinal information signals provided by a light responsive photocomposition control circuit.

INVENTOR
AUSTIN ROSS
BY
Brumbaugh, Graves, Donohue & Raymond
ATTORNEYS

INVENTOR
AUSTIN ROSS

BY Brumbaugh, Graves, Donohue & Raymond

ATTORNEYS

APPARATUS FOR CONTROLLING PHOTOCOMPOSITION ON A CRT SCANNER

BACKGROUND OF THE INVENTION

This invention relates to apparatus for controlling photocomposition on a flying spot scanning device and, more particularly, to apparatus for controlling the size and location of segmental pictorial or other information on the color separation images prepared from a plurality of scanned transparencies representative, for example, of separate pieces of copy.

In color photocomposition work, separation images are prepared from color images or transparencies which are scanned by a flying spot scanning device or the like. During the photocomposition process, each color separation image as prepared will contain the several pictures or images in a pattern, viz, size and location, which corresponds to the pattern in which the pictures are arranged for the initial scanning by the flying spot scanning device.

Frequently, it is desirable to rearrange or modify the sizes and locations of the pictures in the separation images. Without some method of automatically controlling the original scanning of the color transparency, the rearrangement of the originally recorded pattern on the separation images becomes a complex and tedious operation.

SUMMARY OF THE INVENTION

In accordance with the invention, there is provided in a color photocomposition system a control system for controlling automatically the original scanning of at least one color transparency in accordance with preselected positional and magnitudinal information signals.

This is accomplished by providing a photocomposition control circuit which comprises a masking device having light-responsive segments (e.g., light-transmissive or reflective) arranged in a pattern corresponding to a desired pattern of pictures or other information to be recorded on the color separation images being prepared from at least one scanned color transparency. The masking device is scanned concurrently with the original scanning of the at least one color transparency point by point by a flying spot scanner, for example, and supplies to the sweep circuits of the flying spot scanner positional and magnitudinal information signals corresponding to the position and size of the light-responsive segments of the masking device. Thus the flying spot scanner scans the at least one color transparency in a pattern which corresponds to the pattern of the light-responsive segments of the masking device.

DESCRIPTION OF THE PREFERRED EMBODIMENTS

Figures 1, 1A, 3:
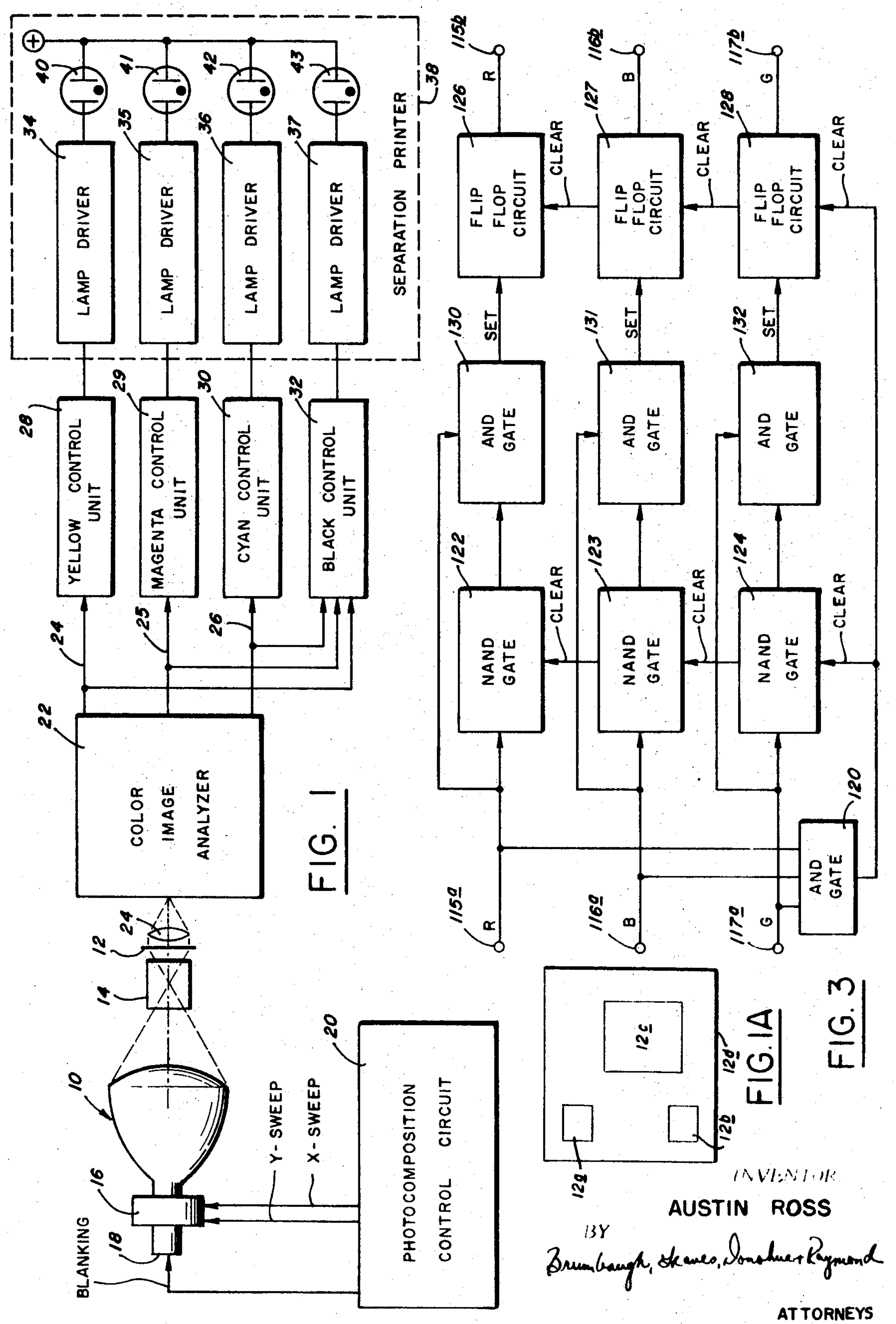
FIG. 1 is a schematic block diagram of a scanner apparatus incorporating one exemplary embodiment of a photocomposition control circuit arranged according to the present invention.
FIG. 1A is a diagrammatic representation of the side-by-side arrangement of a plurality of transparencies as used in the apparatus of FIG. 1.
FIG. 3 is a schematic block and circuit diagram of a supplemental logic system that may be incorporated into the embodiment of the photocomposition control circuit of FIG. 2 in accordance with the present invention.

In the embodiment of the invention illustrated in FIG. 1, a flying spot scanner 10 scans a plurality of color transparencies 12 (e.g., two standard 35 mm. color transparencies **12*a* and 12*b* and a conventional 2¼-inch square (Rolliflex) transparency mounted, as shown in FIG. 1A, in any suitable way and position on a transparent copy board 12*d* having an overall area corresponding to the scan area of the scanner 10, each transparency having distinct and usually different informational content or copy) through a projection lens 14 under the control of X-and-Y-sweep deflection voltage signals supplied to the deflection yoke 16 thereof and blanking signals supplied to the beam intensity control electrode 18 thereof from a photocomposition control circuit 20. In the FIG. 1 embodiment, the three separate transparencies 12*a*, 12*b* and 12*c* (FIG. 1A) are situated in the optical path of the scanner 10**. As will be apparent hereinafter, there is no limit to the number of transparencies that can be photocomposed in a particular pattern by the apparatus of the present invention.

The scanning spot of the scanner 10 is controlled by the Y-sweep and X-sweep deflection voltage signals in accordance with a predetermined program, as will be described in detail hereinbelow with reference to FIG. 2. The program implements the reproduction and recording of color separation images with information segments or pictures thereof occupying a desired location and area in the color separation image. For example, instead of initiating the scanning as in conventional television procedure at the top left-hand corner of the first transparency **12*a*, the scanning spot may be programmed to start scanning the second transparency 12*b* of the plurality of transparencies 12**. The pictorial information segment initially scanned by the scanning spot will however, be reproduced at some selectively controlled location in the color separation image.

As in conventional color-scanning apparatus, a color image analyzing unit 22 receives the light transmitted by the transparencies 12 by way of suitable optical means, such as a condensing lens 24. The color image analyzing unit 22 divides the transmitted light into three separate primary color components which are applied to three corresponding internal photoelectric devices which produce respective electrical signals instantaneously representing the brightness of the corresponding color component at the point in the transparencies 12 which intercepts the scanning beam at that instant.

These three electrical signals, carried by corresponding conductors 24, 25 and 26, are applied to corresponding yellow, magenta and cyan control units 28, 29 and 30, respectively, which perform various corrective functions such as compression, color masking, etc. in a manner well known in the art so that the final color print produced from the separation images will have the desired characteristics. In addition, the three signals are applied to a black control unit 32 which derives electrically a black printer signal for four-color work utilizing the under color removal principle. The black control unit 32 may, for example, be arranged as described in the U.S. Pat. No. 2,892,016 to Hall.

From the four control units 28, 29, 30 and 32, the four corrected signals are applied to four lamp driver circuits 34–37, respectively, in a separation printer 38. The lamp driver circuits 34–37 control the intensities of four conventional glow lamps 40–43, respectively, which are arranged in the usual manner to illuminate separate sheets of photographic film (not shown) so as to provide color separation images. Generally, conventional scanner systems are arranged to produce increasing glow lamp intensities for increasing brightness of the corresponding color components in the transparencies 12 so that positive transparencies will produce negative images on the separation film sheets. If desired, however, positive separation images may be produced from original positive images by including signal inverters between the control units 28–30, 32 and the lamp drivers 34–37, respectively, as is understood in the art. The recording of the negative or positive images, as the case may be, on the separation film sheets, occurs in a pattern which follows the programmed pattern.

Figure 2:
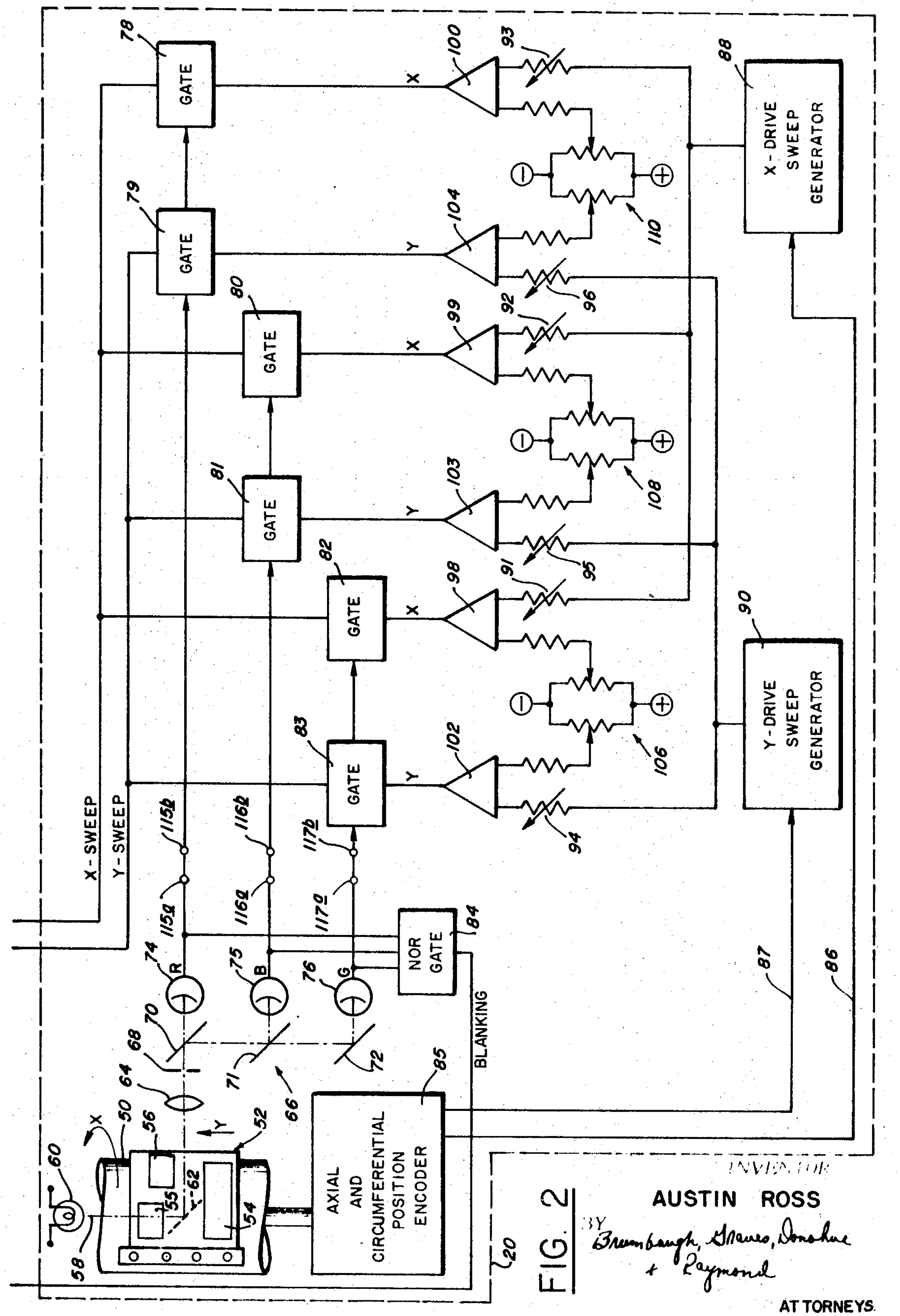
FIG. 2 is a schematic block and circuit diagram of the photocomposition control circuit shown in FIG. 1.

In the exemplary embodiment of the photocomposition control circuit shown in FIG. 2, a transparent drum 50 carries a transparency 52 having recorded thereon in distinct segmental areas color selective masks or filters 54, 55 and 56 which are identical in size and location with the desired size and location of the pictorial or other information to be recorded in the color separation images being prepared from the three color transparencies 12 (FIG. 1). Outside the area of the filters 54–56, which may be respectively adapted to transmit only red, blue or green color components, for example, the transparency 52 is opaque. As conventionally practiced, the drum 50 is rotated in the direction indicated by the arrow designated by the letter X and is also moved in the axial direction as shown by the arrow designated by the letter Y so that a beam of white light 58 emitted by a source 60 after reflection by a stationary internal mirror or other suitable optical means 62, scans the entire transparency 52 point-by-point.

Depending upon the axial and circumferential position of the drum 50, either light will be selectively transmitted by one of the color selective filters 54, 55, 56 or no light will be transmitted at all. The beam of light transmitted by the filters 54–56 is collected by a condensing lens 64 and focused onto a conventional color selective beam splitter 66 by way of an aperture 68. The beam splitter 66 comprises a dichroic mirror 70 which passes only red incident light, a dichroic mirror 71 which passes only the green incident light reflected by the mirror 70 and a reflecting mirror 72 which reflects the green light passed by the mirror 70.

Optically coupled to the mirrors 70–72 are corresponding photoelectric devices 74–76, respectively, which generate electric signals representative of the brightness of the light transmitted by one of the corresponding filters 54, 55 or 56, at the point in the filter area of the transparency 52 which intercepts the beam 58. Where the opaque portions of the transparency 52 are interposed between the light beam 58 and the photoelectric devices 74–76, none of the devices will generate an electric signal. Corresponding conductors labeled R, B and G, respectively, couple each of the photoelectric devices to the enabling input terminals of three sets of gates 78, 79; 80, 81; and 82, 83 by way of coupling links **115*a*—115*b*, 116*a*—116*b* and 1172—117*b* to be described hereinafter with reference to FIG. 3, and to the input terminals of a NOR gate 84. As will be explained in more detail hereinafter, when none of the photoelectric devices 74–76 generates an electrical signal, the NOR gate 84 is enabled or rendered conductive. The voltage signal appearing at the output of the NOR gate 84 when the gate is enabled is employed as a blanking signal to turn off the beam current in the flying spot scanner 10** (FIG. 1).

Connected to the drum 50 is an axial and circumferential position encoder 85 which may be any suitable conventional type capable of encoding the axial and circumferential position of the drum 50 into positional signals Y and X. The Y-signal corresponds to the axial positioning of the drum 50 and the X-signal corresponds to the circumferential positioning of the drum 50.

These positional signals are supplied by conductors 86 and 87 to an X-drive sweep generator 88 and to a Y-drive sweep generator 90 which generate conventional vertical (X-sweep) and horizontal (Y-sweep) scanning control voltage signals in synchronism with the axial and rotational movement of the drum 50. From the generators 88 and 90, the X-and-Y-sweep signals are supplied by way of variable resistors 91, 92 and 93 and 94, 95, 96 to the input terminals of summing amplifiers 98, 99, 100 and 102, 103, 104, respectively. The other input terminals of the amplifiers 98, 102; 99, 103; and 100, 104, are connected by way of fixed resistances to variable potential networks 106, 108 and 110, respectively. In the amplifiers 98–100 and 102–104, the DC voltage signals developed by the networks 106, 108 and 110 are either added to or subtracted from the variable X-and-Y-sweep signals supplied by way of the variable resistances 91–93 and 94–96 to the amplifiers 98–100 and 102–104, respectively.

It can be seen that by varying the resistances 91–93 and 94–96, X-and-Y-sweep voltages having varying slopes will be generated by the amplifiers 98–100 and 102–104, respectively. In this manner, the area scanned by the scanning beam in the flying spot scanner 10 (FIG. 1) may be controlled. Similarly, by varying the magnitude and polarity of the DC signals supplied to the amplifiers 98–100 and 102–104, respectively, by the networks 106, 108 and 110, the DC bias of the X-and-Y-sweep signals may be controlled to control the positioning of the scanning beam in the flying spot scanner 10 (FIG. 1), viz, where the beam initiates and terminates its scan in both the vertical and horizontal directions.

From the amplifiers 98–100 and 102–104, respectively, the variable X-and-Y-sweep signals are supplied to the other input terminals of the gates 82, 80, 78 and 83, 81, 79, respectively. As described above, the gates 78 and 79 are enabled when the red filter 54 of the transparency 52 is interposed between the light beam 58 and the beam splitter 66, the gates 80 and 81 are enabled when the blue filter 55 of the transparency 52 is interposed between the light beam 58 and the beam splitter 66, and the gates 82 and 83 are enabled when the green filter 56 of the transparency 52 is interposed between the light beam 58 and the beam splitter 66. When none of the filters are interposed between the light beam 58 and the beam splitter 66, the gates 78–83 are disabled and a blanking signal is generated by the NOR gate 84. The output terminals of the gates 78, 80 and 82 are coupled together and to the vertical deflection coils of the flying spot scanner 10 (FIG. 1) by the conductor labeled X-sweep. The conductor labeled Y-sweep couples the output terminals of the gates 79, 81 and 83 together and to the horizontal deflection coils of the flying spot scanner 10 (FIG. 1).

In operation and with reference to FIGS. 1, 1A and 2, the transparency 52 (FIG. 2) is prepared so as to include the three color selective filters 54, 55 and 56 arranged in a pattern, viz size and location, which is identical to the pattern in which three pictorial information segments or pictures recorded on the color transparencies 12 (FIG. 1 and 1A) are reproduced in the color separation images. In other words, the filters 54–56 are arranged so as to implement changes in the sizes and locations of the color transparencies 12 as the pictures thereof are recorded on the color separation images provided by the separation printer 38 (FIG. 1). For example, the filter 54 may correspond to the desired size and location on the recorded separation image of the second of the transparencies 12B.

When scanning of the transparency 52 mounted on the drum 50 is initiated, the light beam 58 will initially be intercepted by an opaque portion of the transparency 52 with the result that the NOR gate 84 will be rendered conductive to blank the electron beam in the flying spot scanner 10. The gates 78–83 will also be disabled at this time. The potentiometers 91–93 and 94–96 are adjusted so that when the gates 78–83 are enabled, X-and-Y-sweep signals generated by the amplifiers 98–100 and 102–104, respectively, will have slopes corresponding to the area enlargement or area reduction for the pictures recorded on the transparencies 12 as the pictures are recorded on the color separation images. The variable potential networks 106, 108 and 110 are also adjusted so as to vary the DC biasing of the x and y signals generated by the amplifiers 98–100 and 102–104, respectively, with the result that the positioning of the scanning beam in the flying spot scanner 10 can be controlled. Specifically, the initiation and termination of the scanning by the scanning beam of the flying spot scanner 10 is controlled such that each of the transparencies 12 will be recorded on the color separation images in a location corresponding to the location of a particular filter on the transparency 52.

As the drum 50 rotates and is moved axially, the filters 54, 55 and 56 will be interposed sequentially between the light beam 58 and the beam splitter 66. When the red filter 54 is interposed in the path of the light beam 58, the photoelectric device 74 generates an electrical signal which disables the NOR gate 84 such that beam current in the flying spot scanning device 10 is turned on and enables the gates 78 and 79 which transmit X-and-Y-sweep signals which are synchronized to the movement of the drum 50. By adjustment of the potentiometers 93–96 and the variable potential network 110, a selected one (e.g., 12a) of the transparencies 12 is scanned by the controlled scanning beam of the scanner 10 and recorded as a color separation image in a pattern corresponding to the size and location of the filter 54 on the transparency 52. Thus the scanned transparency is reproduced in the color separation image in the area programmed by the position and size of the transparency 52.

When the scanning beam 58 is intercepted by an opaque area of the transparency 52, none of the photoelectric devices 74–76 will produce an output. Accordingly, the gates 78–83 will be disabled and the scanning beam in the flying spot scanner 10 will return to a center or neutral position. At the same time, the NOR gate 84, to which the photoelectric devices 74–76 are coupled, will produce a blanking signal to turn off the beam current in the flying spot scanner 10. If desired, the same blanking signal may be coupled to the lamp drivers 34–37 in the separation printer 38 (FIG. 1) to disable the glow lamps 40–43.

When the blue and green filters 55 and 56 intercept the light beam 58, gates 80, 81 and 82, 83 will be selectively enabled and will transmit X-and-Y-sweep signals that are synchronized to the movement of the drum 50 and that have preselected slopes and DC biasing. Thus the remaining two transparencies 12b and 12c of the transparencies 12 are scanned by the controlled scanning beam of the scanner 10 and recorded on a color separation image in patterns corresponding to the sizes and locations of the filters 55 and 56 on the transparency 52.

The photocomposition control circuit of FIG. 2 causes the beam of the flying spot scanner 10 (FIG. 1) to return to a neutral position when the scanning beam 58 scans an opaque portion of the transparency 52. This would be disadvantageous if it were desired to superimpose lettering on top of the pictures reproduced in the color separation images by means of a knockout mask system.

To overcome this, the logic system illustrated in FIG. 3 is interposed between the coupling links 115a and 115b; 116a and 116b, and 117a and 117b, viz, between the photoelectric devices 74–76 and the gate circuits 78, 79; 80, 81; 82, 83, respectively, in the photocomposition control circuit 20 of FIG. 2. In addition, the transparency 52 mounted on the drum will include transparent portions instead of opaque portions separating the red, blue and green filters 54, 55 and 56, respectively, and the lettering to be reproduced on the color separation will be recorded as opaque letters on the filters 54, 55 and 56.

The photoelectric devices 74–76 are coupled by way of the conductors labeled R, B and G to the input terminals of an AND gate 120 and to the input terminals of three NAND gates 122, 123 and 124, respectively. The AND gate 120 is enabled when the scanning beam 58 scans a transparent portion of the transparency 52 (FIG. 2) and, accordingly, when all three photoelectric devices 74–76 are operative. When enabled, the gate 120 generates a "clear" signal and this signal is applied along the labeled conductors to the other input terminals of the NAND gates 122–124 and to the reset input terminals of three flip-flop circuits 126–128. The clear signal resets the flip-flops 126–128. The signal also operates as a blanking signal to turn off the beam current in the flying spot scanner 10 (FIG. 1).

In addition to being coupled to the NAND gates 122–124, the photoelectric devices 74–76 are coupled to the input terminals of AND gates 130–132. The other input terminals of the AND gates 130–132 are coupled to the output terminals of the NAND gates 122–124, respectively.

The output terminals of the AND gates 130–132 are coupled to the set input terminals of the flip-flop circuits 126–128 and when enabled, the gates 130–132 drive the flip-flop circuits into their set or "1" states. When the flip-flop circuits are set to their set states, the circuits generate enabling R, B and G signals that enable the gates 78, 79; 80, 81; and 82, 83 to transmit the X-and-Ysweep signals to the yoke of the flying spot scanner 10 (FIG. 1).

In operation, when the scanning beam 58 is scanning a filter on the transparency 52, for example, the red filter 54, the photoelectric device 74 is enabled. In the absence of a clear signal, the NAND gate 122 remains disabled. The signal produced by the disabled NAND gate 122, together with the signal produced by the photoelectric device 74, enables the AND gate 130. The gate 130 transmits a set signal to the flip-flop circuit 126 to drive the flip-flop into its set state. While in its set state, the flip-flop circuit 126 enables the gate circuits 79 and 80 which transmit the positional and magnitudinal X-and-Y-sweep signals to the scanning yoke of the flying spot scanner 10.

The flip-flop circuit 126 will remain in its set state even when the scanning beam 58 is scanning an opaque portion of the red filter 54. However, when the scanning beam 58 is intercepted by a transparent portion of the transparency 52, the three photoelectric devices 74, 75 and 76 will emit signals; the AND gate 120 will be enabled and the clear signal generated by the AND gate 120 will reset the flip-flop circuits 126–128. The clear signal, together with the signals produced by the photoelectric devices 74–76, enables the NAND gates 122–124, respectively, which, in turn, produce signals that disable the AND gates 130–132, respectively. At this time, the gates 79–83 will be disabled and the scanning beam of the flying spot scanner 10 will return to its neutral position.

Although the invention has been described herein with reference to specific embodiments, it will be understood that the invention is susceptible of considerable variation and modification. For example, more than three filters could be mounted on the transparency 52 to allow more than three pictures to be photocomposed. Also, a film of variable density could be mounted on the drum 50 with only a single photoelectric device employed to register the intensity of the transmitted light. Level detectors would be used to identify one area on the transparency from another. Furthermore, the photocomposition control circuit may utilize flatbed, reciprocating or CRT scanning for scanning the transparency 52 and a reflecting mask may be substituted for the transparency 52. Also, the photocomposition control circuit of the instant invention may be utilized to photocompose the several distinct pictorial segments of a singular transparency. Accordingly, all such variations and modifications are included within the intended scope of the invention as defined by the following claims.

I claim:

1. A photocomposition control circuit for controlling automatically the original scanning by a scanning device of at least one color transparency to implement the reproduction of at least segments of information of said color transparency in a desired pattern on color separation images comprising masking means having a plurality of light responsive segments each having different selected characteristics arranged in a pattern corresponding to the size of information at a given location in said desired pattern, scanning means for scanning said masking means concurrently with the scanning of the color transparency, means responsive to the positioning of the scanning beam on said masking means for generating positional and magnitudinal information signals and selectively transmitting said signals to said scanning device.

2. A control circuit according to claim 1 wherein the scanning beam positioning responsive means comprises means for generating a plurality of positional and magnitudinal information signals corresponding to the plurality of light-responsive surfaces of the making means and gating means for selectively each said positional and 60 information signals in accordance with the pattern of the light-responsive segments of the masking means.

3. A control circuit according to claim 2 wherein each of the segments of the color transparency has associated therewith a distinct light-responsive surface of the masking means and wherein the positional and magnitudinal information signal generating means comprises means for controlling each of said information signals such that each of said signals produces an area reduction or area enlargement in the scanning of its associated segment of the color transparency by the scanning means and produces a scanning only of said associated segment of the transparency.

4. A control circuit according to claim 2 wherein the masking means comprises drum means carrying a color transparency having recorded thereon light-responsive segments arranged in said desired pattern and wherein the gating means comprises means selectively responsive to the light transmitted by the light-responsive segments of the color transparency for transmitting the positional and magnitudinal information signals in a sequence corresponding to the sequence in which the light-responsive segments intercept the scanning beam of the scanning means.

5. A control circuit according to claim 4 wherein the scanning beam positioning responsive means comprises means for encoding the axial and circumferential position of the drum into positional signals and means responsive to said positional signals for generating first and second sweep deflection voltages.

6. A control circuit according to claim 5 wherein a plurality of transparencies corresponding in number to the plurality of light-responsive segments of the transparency carried by the drum are scanned by the scanning device.

7. A control circuit according to claim 5 wherein the scanning beam positioning responsive means comprises a first plurality of amplifiers corresponding in number to the plurality of light-responsive segments on the color transparency carried by the drum means and responsive to the first sweep deflection voltages and a second plurality of amplifiers corresponding in number to the plurality of light-responsive segments on the color transparency carried by the drum means and responsive to the second sweep deflection voltages.

8. A control circuit according to claim 7 wherein each of said amplifiers comprises means for adjusting the slope of the sweep deflection voltage amplified thereby such that the slope corresponds to the area enlargement or area reduction for its associated transparency as the picture thereof is produced on the color separation image and means for adjusting the DC level of the sweep deflection voltage amplified thereby such that the picture of the transparency associated therewith is produced on the color separation image in a location corresponding to the location of its associated light-responsive segment on the color transparency carried by the drum means.

9. A control circuit according to claim 4 wherein the masking means comprises drum means carrying a color transparency having recorded thereon color selective filters arranged in the desired pattern and opaque portions separating the color selective filters.

10. A control circuit according to claim 9 wherein the gating means further comprises means operative concurrently with the scanning of an opaque portion on the color transparency for turning off the beam current in the scanning device.

11. A control circuit according to claim 4 wherein the masking means comprises drum means carrying a color transparency having recorded thereon color selective filters arranged in the desired pattern and transparent portions separating the color selective filters.

12. A control circuit according to claim 11 wherein the gating means further comprises means operative concurrently with the scanning of a transparent portion on the color transparency for turning off the beam current in the scanning device and for disabling the positional and magnitudinal information signal transmitting means.

* * * * *